(12) United States Patent
Boyd et al.

(10) Patent No.: US 8,000,506 B2
(45) Date of Patent: Aug. 16, 2011

(54) FINGERPRINT DETECTING WIRELESS DEVICE

(75) Inventors: Michael Boyd, Lakeport, CA (US); Eric C. Hannah, Pebble Beach, CA (US); Randy R. Dunton, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/589,287

(22) Filed: Oct. 21, 2009

(65) Prior Publication Data

US 2010/0045433 A1 Feb. 25, 2010

Related U.S. Application Data

(63) Continuation of application No. 10/974,241, filed on Oct. 26, 2004, now Pat. No. 7,787,660.

(51) Int. Cl.
*G06K 9/00* (2006.01)
(52) U.S. Cl. .................. 382/124; 340/5.53; 340/5.83

(58) Field of Classification Search .................. 382/124; 340/5.53, 5.83
See application file for complete search history.

(56) References Cited

U.S. PATENT DOCUMENTS

| 5,546,471 | A | * | 8/1996 | Merjanian | 382/124 |
| 6,256,019 | B1 | * | 7/2001 | Allport | 345/169 |
| 6,508,709 | B1 | * | 1/2003 | Karmarkar | 463/42 |
| 6,947,580 | B1 | * | 9/2005 | Kinsella | 382/124 |
| 2002/0016971 | A1 | * | 2/2002 | Berezowski et al. | 725/105 |

* cited by examiner

*Primary Examiner* — John B Strege
(74) *Attorney, Agent, or Firm* — Trop, Pruner & Hu, P.C.

(57) ABSTRACT

A wireless device, such as a remote control unit, may include an internal fingerprint identification unit. The fingerprint identification unit may be arranged to capture the user's fingerprint when the user's finger is positioned over a button that is substantially radiation transmissive. Radiation directed at the user's finger through the button may be captured for image analysis and ultimately for fingerprint identification. Thus, the device may be used to identify users who wish to access a processor-based system such as a processor-based television receiver.

8 Claims, 4 Drawing Sheets

FINGERPRINT DETECTING WIRELESS DEVICE

CROSS-REFERENCE TO RELATED APPLICATION

This application is a continuation of U.S. patent application Ser. No. 10/974,241, filed on Oct. 26, 2004, which is a divisional application of application Ser. No. 09/693,424, filed on Oct. 20, 2000, now U.S. Pat. No. 6,850,632, which is a continuation-in-part of application Ser. No. 09/301,172, filed on Apr. 28, 1999, now U.S. Pat. No. 6,337,919.

BACKGROUND

This invention relates generally to a wireless device used to provide user input signals for controlling electronic systems.

Often, a computer system or the network coupled to a given computer system may contain very sensitive information. Therefore, it may be desired that only authorized users obtain access.

In addition, in computer based transactions, such as banking transactions and on-line sales transactions, it may be desirable to have a secure way of determining whether a given user is who the user claims to be. While passwords have widely been used for this function, it is well known that users are not always careful with their passwords. Thus, the password protection may not always be an accurate way of ensuring user identity.

Fingerprint identification units are used in connection with computer systems. Generally, these systems are coupled to the computer system through a standalone peripheral or via a keyboard. Thus, the user must be prompted to actuate a separate input device in order to capture the user's fingerprint. Normally, the computer system has a database of fingerprints and compares the detected fingerprint to that database. Based on the comparison, the user can be assigned an access level from no access to complete access to all the files and capabilities of a given system.

Thus, there is a continuing need for better ways to assess the user's identity including ways that do not require extra user steps.

DETAILED DESCRIPTION

Figure 1:
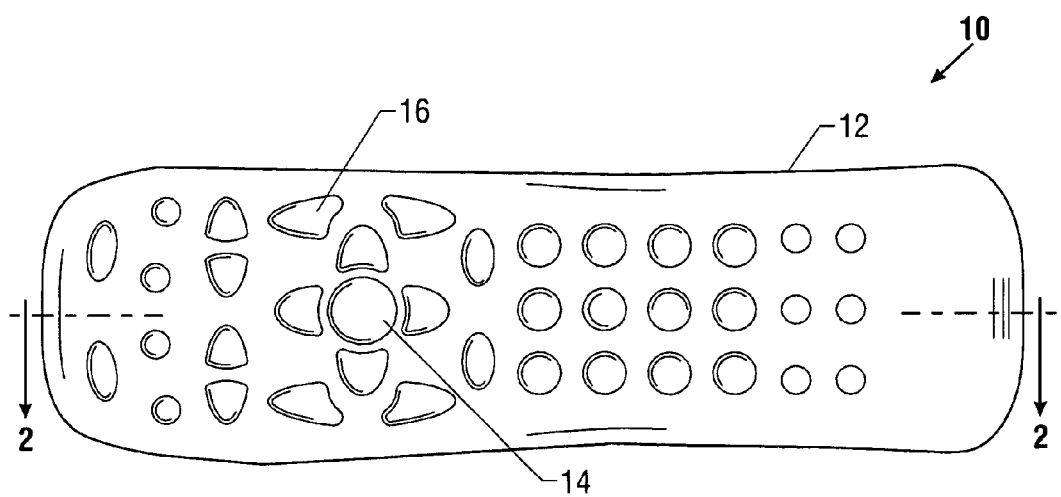
FIG. 1 is a top plan view of one embodiment of the present invention.

A wireless device 10, shown in FIG. 1, includes a plurality of keys 16 and a select button 14 on a housing 12. In one embodiment, the device 10 is a wireless remote control unit. The device 10 may communicate with a processor-based system such as a computer or processor-based appliance. In one embodiment, a remote control unit communicates with a television receiver.

The button 14 in one embodiment of the present invention may be formed of a substantially radiation transmissive material. An image of the user's fingerprint may be captured when the user's finger is positioned over the select button 14.

Figure 2:
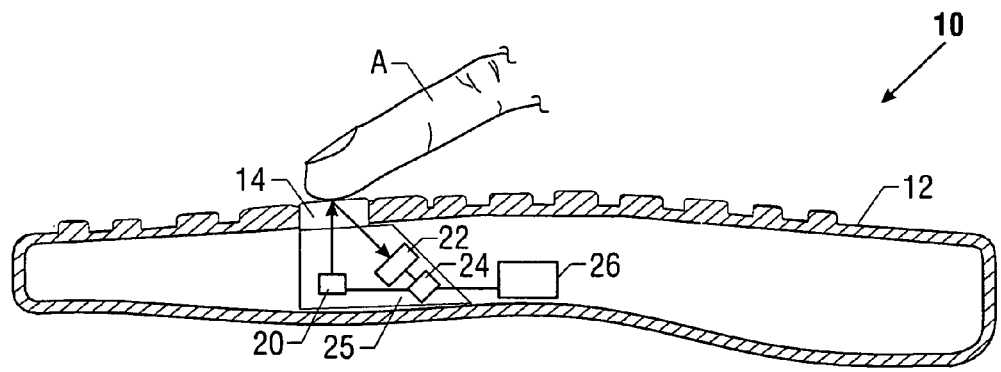
FIG. 2 is a cross-sectional view taken generally along the line 2-2 in FIG. 1 when a user's finger is positioned over a mouse button.

Referring now to FIG. 2, when the user's finger A is positioned on the select button 14, an image of the user's fingerprint may be captured. In the housing 12, a radiation source 20 illuminates the lower surface of the user's finger A through the radiation transmissive button 14. In one embodiment of the present invention, the button 14 may be substantially light transmissive and the source 20 may be a source of radiation in the visible spectrum such as a light emitting diode (LED).

The light reflected off the lower surface of the user's finger is processed by optical elements 22 and captured in an image sensor 24. In one embodiment of the invention, the sensor 24 may be sensitive to light in the visible range and may be either a charge coupled device (CCD) sensor or a complementary metal oxide semiconductor (CMOS) sensor. The sensor 24 captures an image of the pattern of ridges on the user's finger. Advantageously, the light source 20 is matched to the characteristics of the sensor 24.

The sensor 24 may be coupled to conventional interface circuitry 26 that is adapted to wirelessly convey information about the image captured by the sensor 24 to a processor-based system. Suitable wireless communication protocols include radio frequency and infrared protocols. Both one-way and two-way wireless protocols may be used but one-way protocols may be more cost effective. Also, the circuitry 26 may control the timing of the operation of the radiation source 20.

The optical system 22 and the sensor 24 may be adapted to move with the button 14 or may be separately mounted. For example, the optical system 22, radiation source 20, sensor 24, and button 14 may be coupled by a plate 25. If the system, including the source 20, moves with the button 14, the system can capture the fingerprint in the right focal orientation regardless of whether the button is pushed or unpushed. If the system does not move with the button 14, the focus may be slightly different depending on the actuation of the mouse button; however, this slight change may not adversely impact the integrity of the image. For example, the system may be designed to capture the image only when the button 14 is in one position, either the actuated or unactuated position. In other cases, the system may be adapted to capture in either position, and is adjusted for focus to an intermediate point between the two positions so that both may be adequately imaged but neither is in perfect focus. Since in many cases, the amount of deflection of the button 14 is relatively small, focus may not be a serious concern.

Figure 3:
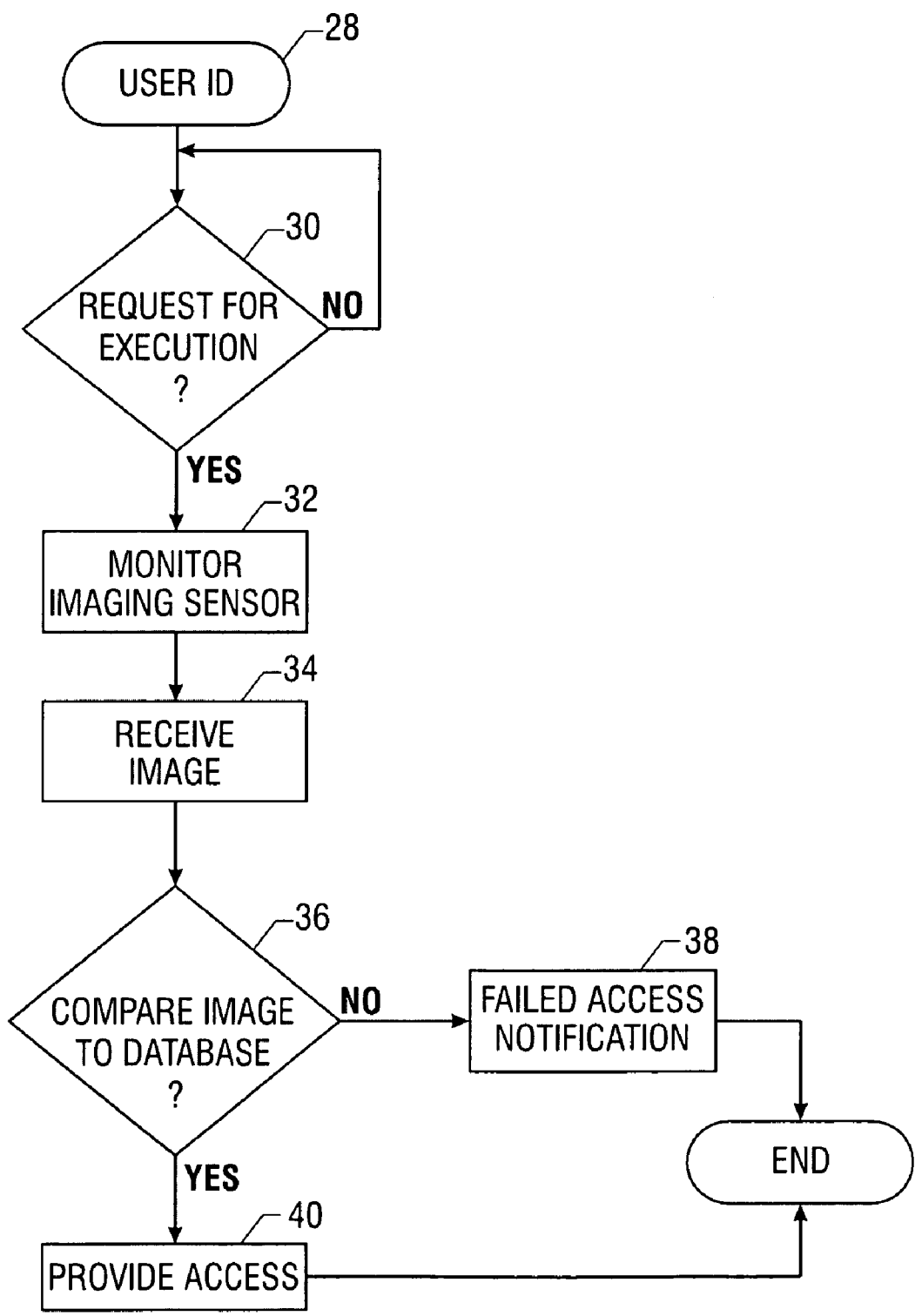
FIG. 3 is a flow chart showing software for implementing a fingerprint identification system in accordance with one embodiment of the present invention.

Referring next to FIG. 3, the software 28 in accordance with one embodiment of the present invention, is adapted to automatically implement a user identification system. Initially, the system determines whether there is a request for execution as indicated at diamond 30. The request for execution may be a request for access to a system such as a network. It may also be a request for execution of a particular application software for which access control is desired. Thus, the request for execution detected at diamond 30 may be an initial request for access to a network, or it may arise at any time when a particular application is requested. The request for execution may be detected from the operation of the button 14, upon actuation of another input device, or in any other way.

In one embodiment, the button 14 may be periodically imaged. Thus, if the computer system is left unused, a different user may not be able to use the computer system if his or her fingerprint is not recognized.

Once the request for execution has been detected, the imaging sensor 24 is monitored as indicated in block 32. Thus, the system begins imaging the area over the button 14. When an image is received, as indicated in block 34, the sensor 24 may capture the image and may convey it to the electronics 26 for analysis in a remote processor-based system in one embodiment of the invention.

In the remote processor-based system, the image is compared to a database of authorized users as indicated in diamond 36. If there is a substantial match, access may be provided to the requested capabilities, as indicated in block 40. Otherwise, the user is notified that access has been denied, as indicated in block 38.

While the above software illustrates a system in which the image analysis is done in a host computer system, in some embodiments it is also possible to do the image analysis using processing capabilities provided within the device 10 itself. In such case, the amount of information, which the device 10 must send back to the processor-based system, is reduced.

In one embodiment of the present invention, the button 14 may be activated in the course of an on-going television program. The button activation event may then be correlated to a particular channel being viewed at the time of the button activation. This information may then be combined to identify items that a viewer wishes to purchase. The purchased item may correspond to a pay-per-view television program currently available for viewing on the tuned-to channel. Alternatively, the item purchased may correspond to an advertised product or service currently displayed on a particular tuned-to channel. By knowing the time when the user activated the button 14 and the channel the user is tuned to, it is possible to determine what product or service the user wished to select when the use operated the button 14.

Figure 4:
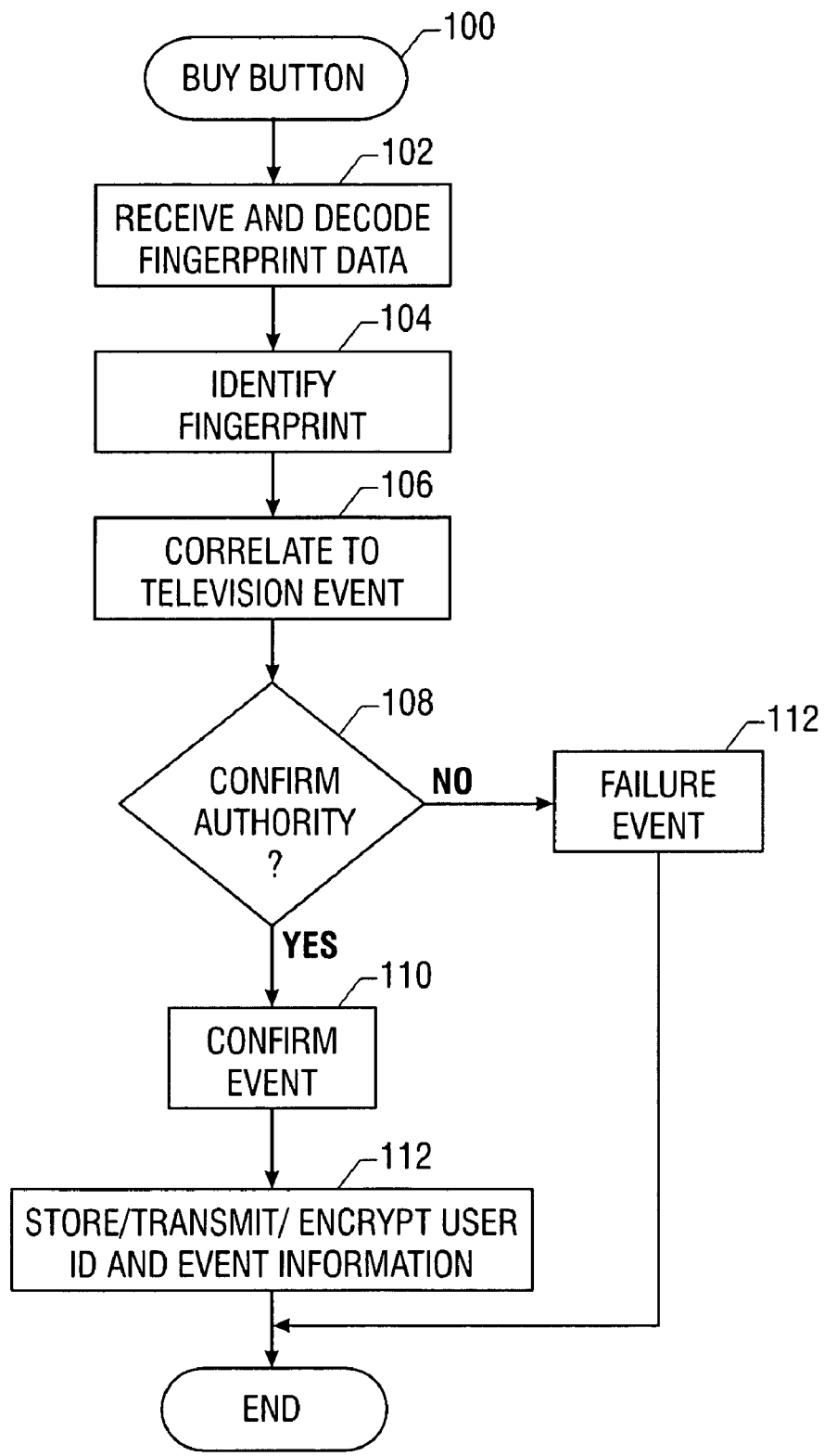
FIG. 4 is a flow chart showing software for implementing a purchasing system in accordance with one embodiment of the present invention.
Figure 5:
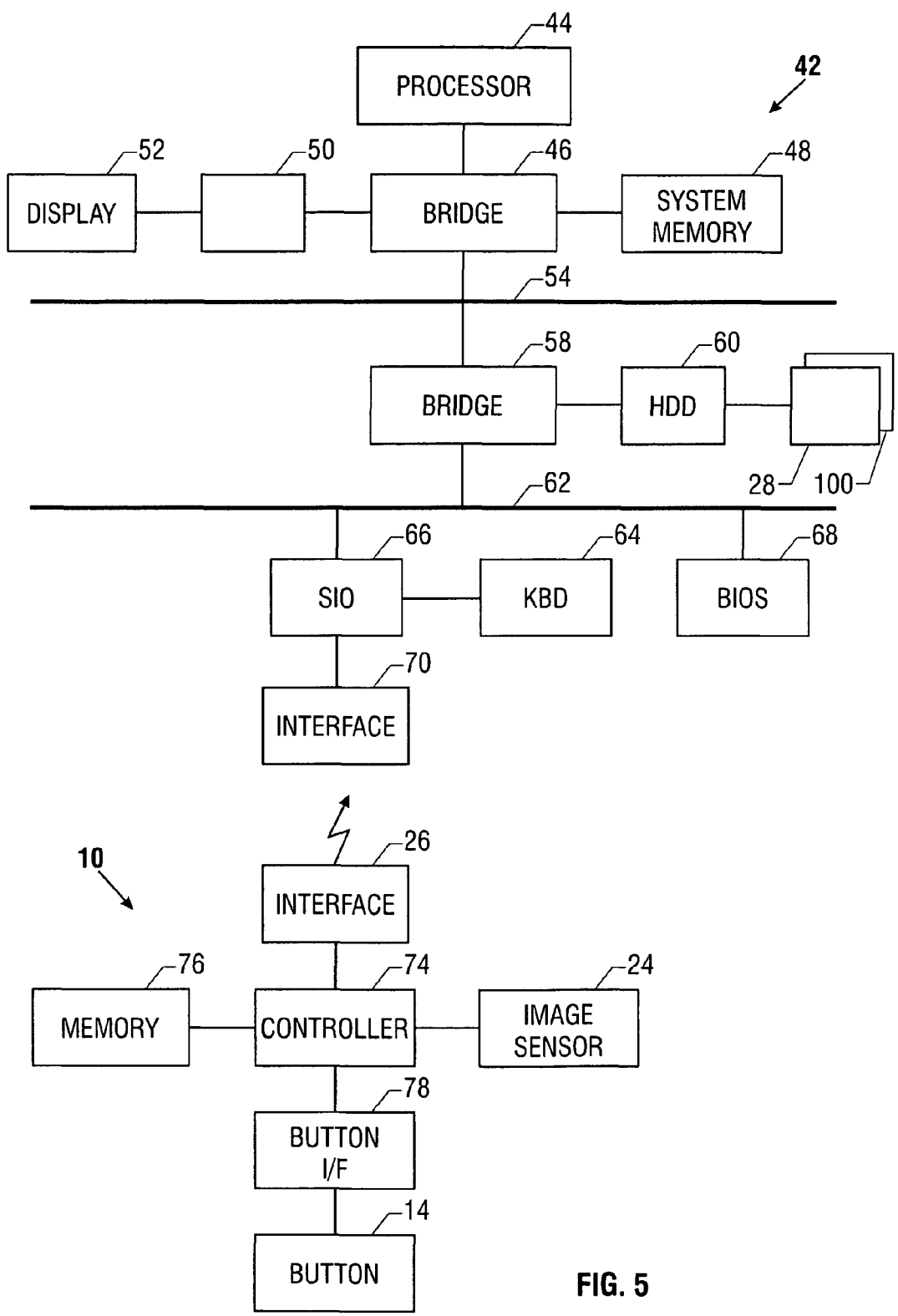
FIG. 5 is a block diagram showing one embodiment of the present invention.

Referring to FIG. 4, the buy button software 100 begins by receiving and decoding the fingerprint data from the device 10, as indicated in block 102. Advantageously, the communication of the fingerprint data may be suitably encrypted to prevent interception and use of the data to produce spurious buy signals. A relatively simple encryption technique may be utilized in some embodiments.

When the fingerprint data is received by a remote processor-based system, the fingerprint data may be identified and correlated to a particular viewer. In one embodiment of the present invention, in a training phase, the user provides the user's fingerprint by pressing on the button 14 and identifying appropriate information. That information may include the user's name or identification number. The information may also include the scope of products and services that the user (or the user's parent) wishes to enable the user to acquire. Thus, a family may determine that certain items may be acquired or purchased by certain family members and not by other family members. By encoding each user's fingerprint and associated identity and qualifications to purchase particular items, the system can control what items can be purchased by particular users.

As one example, certain products may be unsuitable for purchase by minors. In other cases, a user's parents may not wish to allow a minor user to purchase various products. These decisions may be enforced by capturing a fingerprint and thereby identifying the person present and attempting to make the purchase.

Once the fingerprint has been identified (block 104), the button actuation time can be correlated to a particular television event. Knowing what channel is currently being received and knowing the button activation time, allows a determination of the associated event. Thus, in one embodiment of the present invention, the software may enable the currently tuned channel to be acquired and stored together with the fingerprint data and a time stamp indicating the time of the button actuation (block 106).

In diamond 108, a check determines whether the particular user is authorized to make the particular purchase. This again goes to the particular user settings. While an embodiment is illustrated in which this determination is made on a processor-based system separate from the device 10, for example resident in the user's home, the determination could also be made at a more remote location such as at a server. In such case, the qualifications for various users may be forwarded to the remote location or server for enforcement of those decisions.

If authority exists to make the particular purchase, as determined in diamond 108, the purchase event is confirmed as indicated in block 110. This may be done by providing an appropriate on-screen display. Otherwise, a failure event may be initiated as indicated in block 112. Again, an appropriate on-screen indication may be provided in some embodiments.

If the purchase is accepted, the information may be stored, encrypted, and/or transmitted to a remote location to complete the purchase and billing cycle. For example, the information about the time when the button 14 was actuated, the identity of the purchaser who made the acquisition and channel information can be forwarded to the remote system (over the Internet or a phone system as two examples) to facilitate the identity of a particular item.

While different programs may be available at different times in different localities, the user's identity aids in correlating a particular user to a particular time zone. The program broadcast on a particular channel in that time zone at a particular time can then be identified.

In this way, the user is able to make a purchase of an item displayed on a television screen with as little as one button actuation. That is, a single button actuation may be sufficient to authenticate the user so that it is not necessary to provide other authentication information such as credit card information, in some embodiments.

According to one embodiment of the present invention, the hardware for implementing a processor-based system 42 which acts as a host for the device 10, includes a processor 44 coupled to a bridge 46 which may be north bridge in one embodiment of the present invention. The bridge 46 is coupled to system memory 48 and a graphics accelerator 50. A display 52, such as a television receiver, may be coupled to the graphics accelerator 50.

In one embodiment, a second bridge 58 couples a hard disk drive 60 which may contain the software 28 and 100 for implementing specific embodiments of the imaging device as a fingerprint identification system. The disk drive 60 may also store the database of user fingerprint images.

The bridge 58 is coupled to another bus 62 that couples the keyboard 64 and an interface 70 through a serial input/output (SIO) interface 66, for example. A binary input/output system (BIOS) 68 may also be coupled to the bus 62.

The SIO interface 66 may communicate with a wireless interface 70. The interface 70 may be adapted to decode signals from a suitable wireless protocol such as an infrared protocol or radio frequency protocol. In the illustrated embodiment, the interface 70 receives unidirectional signals from an interface 26 included as part of the device 10.

The interface 26 is coupled to a controller 74. The controller 74 is coupled to a memory 76. The controller 74 is also coupled to the imaging sensor 24 and to a button interface 78.

The button interface 78 is coupled to the button 14. In some cases, software may be included on the memory 76 to enable the device 10 to handle fingerprint data and in some cases to encrypt that data for transmission wirelessly between the interfaces 26 and 70.

In some embodiments, it may be desirable to prevent replacement of the fingerprint detecting device 10 with another device 10 which may aid in circumventing the protection provided by the fingerprint identifying device 10. For example, in some embodiments, the mouse may include a memory such as a FLASH memory which stores a device 10 identification number which is a unique identification number for each such device 10. In an initial set-up program in the host computer, an identification number may be recorded. If a different device 10 is plugged into the host computer with a different number or no number at all, a computer may refuse to accept the new mouse capability. The software check of the device 10 may be done continuously or may be done during an initial log-on sequence or at boot-up.

Thus, in some embodiments the user may be identified without requiring extra user steps. In some embodiments, the user may not even be aware that a fingerprint analysis is being conducted.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A non-transitory computer readable storage medium having instructions stored thereon that when executed by a processor-based system cause the processor-based system to:
   detect finger operation of an input device to make a selection unrelated to a security function;
   in response to the detection of the finger operation, receive fingerprint information;
   identify a user of the processor-based system corresponding to the received fingerprint information; and
   determine if the requested use of the processor-based system is authorized based on the identified user and parental control information associated with the identified user.

2. The computer readable storage medium of claim 1, having further instructions stored thereon that when executed by the processor-based system cause the processor-based system to:
   store information related to a scope of services that a user may access based on the parental control information.

3. A non-transitory computer readable storage medium having instructions stored thereon that when executed by a processor-based system cause the processor-based system to:
   store information related to a scope of services allowed for a user based on information represented as a parental determination for the user;
   receive a signal indicative of finger operation of an input device to make a selection unrelated to a security function;
   receive fingerprint information in response to finger operation;
   identify the user of the processor-based system corresponding to the received fingerprint information; and
   determine if the requested use of the processor-based system is allowed based on the identified user and the stored information related to the scope of services correlated with the identified user.

4. The computer readable storage medium of claim 3, wherein the requested use of the processor-based system corresponds to a request to execute a particular application.

5. The computer readable storage medium of claim 3, wherein the requested use of the processor-based system corresponds to a request to access a network.

6. The computer readable storage medium of claim 3, wherein the requested use of the processor-based system corresponds to a request to view content on the processor-based system.

7. A non-transitory computer readable storage medium having instructions stored thereon that when executed by a processor-based system cause the processor-based system to:
   detect finger operation on an input device to make a selection unrelated to a security function;
   capture fingerprint information in response to the finger operation;
   compare the received fingerprint information against information corresponding to an authorized match; and
   determine if the requested use of the processor-based system is permitted based on the authorized match and parental control information associated with the authorized match.

8. The computer readable storage medium of claim 7, having further instructions stored thereon that when executed by the processor-based system cause the processor-based system to:
   store information related to a scope of services permitted for the authorized match based on the parental control information.

\* \* \* \* \*